United States Patent [19]
Kruppenbach et al.

[11] 3,954,154
[45] May 4, 1976

[54] TOWED LAND CABLE

[76] Inventors: John A. Kruppenbach, 4914 Roger Road, Anchorage, Alaska 99502; John W. Bedenbender, 1617 Westlake Drive, Plano, Tex. 75074

[22] Filed: Sept. 9, 1974

[21] Appl. No.: 504,590

Related U.S. Application Data

[62] Division of Ser. No. 75,391, Sept. 25, 1970, abandoned.

[52] U.S. Cl. .............................. 181/112; 340/15; 340/17 R; 339/151 C
[51] Int. Cl.² ........................................ G01V 1/16
[58] Field of Search ........... 340/3 T, 7, 15, 15.5 TS, 340/17; 181/112, 122; 339/151 C; 287/80; 174/70 R

[56] References Cited
UNITED STATES PATENTS

| | | | |
|---|---|---|---|
| 2,423,591 | 7/1947 | Flude | 340/7 R |
| 2,551,417 | 5/1951 | Carlisle | 340/3 T |
| 2,568,851 | 9/1951 | Flude | 340/7 R |
| 3,435,410 | 3/1969 | Babb | 340/7 |

*Primary Examiner*—Maynard R. Wilbur
*Assistant Examiner*—N. Moskowitz

[57] ABSTRACT

A land surface seismic prospecting cable which can be towed on the surface of the earth along seismic survey lines. The cable is used to transport, position, protect, house, or attach sensors used for making geophysical and environmental measurements. The cable apparatus may comprise a plurality of segments each interconnected by an electrical connector and each segment having a plurality of sensors associated therewith. The outputs of the signals from the sensors are carried by way of a multiconductor wire cable within the seismic cable to a seismic recorder. After an acoustic disturbance is produced and the seismic information is recorded, the towed land cable or land streamer is towed intact to the next shooting site which saves a great deal of time and allows greater areas to be covered in a predetermined time period.

9 Claims, 3 Drawing Figures

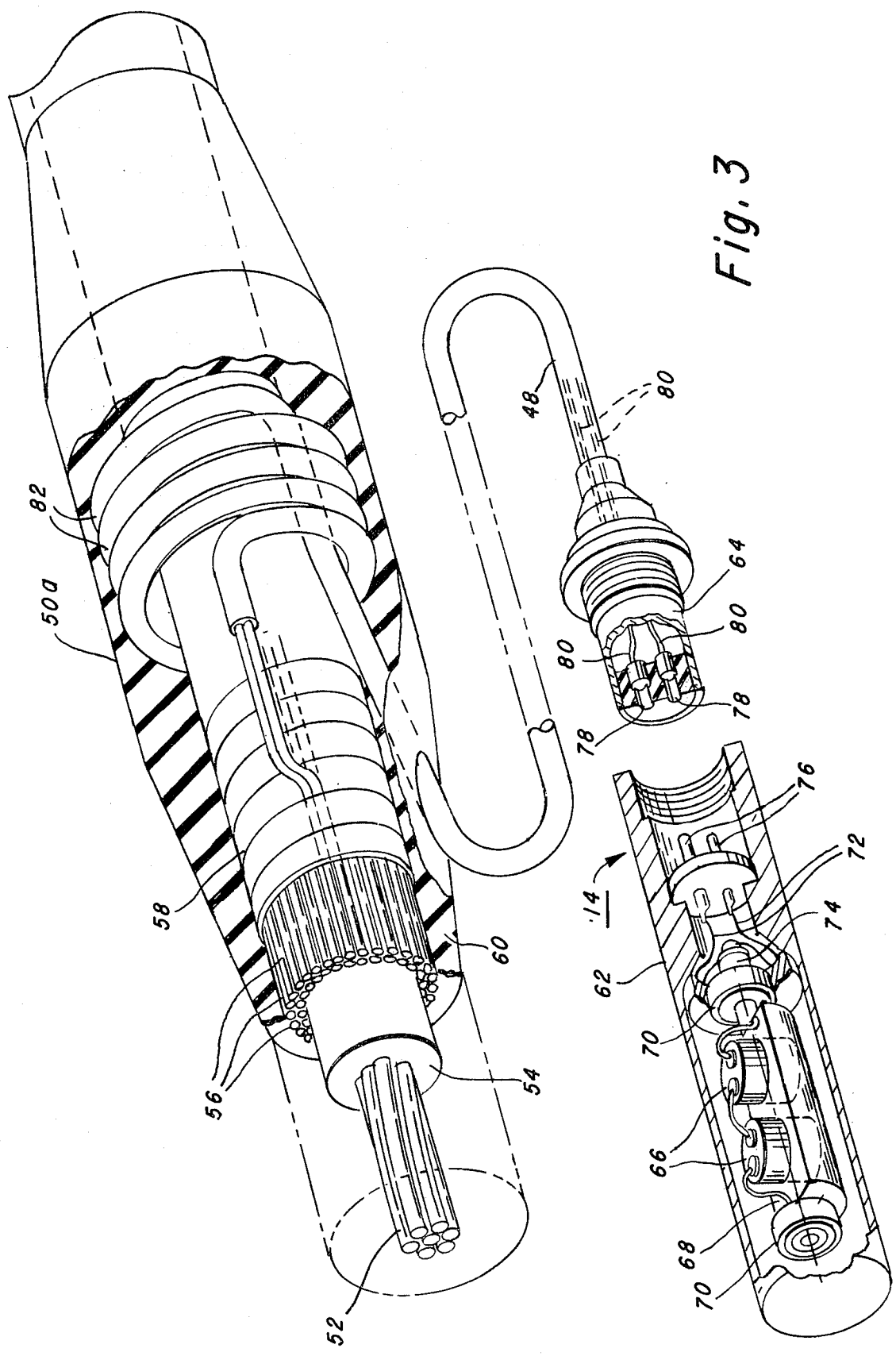

TOWED LAND CABLE

This is a division of application Ser. No. 75,391, filed Sept. 25, 1970, now abandoned.

This invention relates to seismic exploration and more specifically to the field of land surface seismic exploration.

Conventional land prospecting techniques utilize a main cable which includes only the wiring necessary to record the outputs from the geophones on a multichannel recorder. This main cable is usually made of multiple sections. Selectively placed at predetermined intervals along the main cable are a plurality of connectors at which are attached secondary cables having a plurality of geophones associated therewith. The outputs from the geophones for each secondary cable are electrically combined into a single pair of wires which are connected to an associated pair of wires in the main cable.

The method required in utilizing a land seismic cable such as described above requires first laying out in a line the main cable and connecting the various sections of the main cable together. Next the secondary cables must be connected to the main cable. Next, the seismic sensors must be positioned in the correct orientation; depending upon the type of seismic sensor, this may require setting each sensor upright on its base or may require pushing a spike attached to the base of the sensor into the ground to insure good acoustic communication between the ground and the sensor. This procedure is required for each acoustic sensor along the cable. After the above operation is complete, an acoustic disturbance is created and the geophones respond to the acoustic energy resulting therefrom. Outputs of the geophones are transmitted by the cables to a recording system.

After completion of the shooting at a particular site the cable must be moved to a different location. This requires reversing the layout procedure. The pickup of the cable will require disconnecting the secondary cables from the main cable and retrieving the secondary cables with attached geophones and the main cable. The secondary cables are carried with geophones intact on geophone clips. Since the main cable is usually a small diameter, fragile cable, sections of the main cable are man-carried on portable reels or carried on a vehicle-mounted reel. Regardless of the type of cable or how it is used, the cable is never towed (either pulled or pushed). When laying out the cable, it is laid on the ground by unspooling it off of a reel and picked up by spooling in as the spooling apparatus moves along the line so as not to drag or tow the cable to any appreciable extent in any manner due to the fragile character of the cable. The cables are lifted onto the spool, not dragged onto it. The above manner of operation requires one or more large vehicles if the reel is vehicle mounted, plus one or more attendants per vehicle. If portable man-carried reels are utilized, the cable must be comprised of multiple segments so as not to overload the carriers. Each segment or section of cable must be designed to be as light in weight as possible so that the maximum length can be carried on each reel or spool. Accordingly, no stress members are associated with the main or secondary cables. This prospecting technique requires, for example, approximately four men to layout and pickup 1½ miles of cable. It will be noted that substantial time and manipulation is required to move from one location to the other. Because of this, it is an extremely expensive operation. Because of the time lost in set up of the cable and moving from one location to another, the prospecting operations do not cover a large area of land in a given time period. Accordingly a base camp is set up which the survey team returns to after completion of the day's operation.

Heretofore none of the previously known land surface prospecting cables have satisfactorily provided the desired functional efficiency necessary for an economical operation. This is the result primarily because of the inordinate amount of time necessary for movement of the cable from one location to another and the layout and pickup time required.

Accordingly it is a primary object of this invention to provide a new and improved land prospecting cable.

It is another object of this invention to provide a new and improved method of land prospecting.

Another object of the invention is to provide a method of moving a land surface cable from one location to another which minimizes the manipulation and time required and which is economically attractive.

A still further object of this invention is to provide a land surface cable which lends itself to arctic operations.

Another object of this invention is to provide a land prospecting cable which is rugged and durable in construction and which may be towed from one site to another.

Other objects and features of the invention will become more readily understood from the following detailed description and appended claims when read in conjunction with the accompanying drawings, in which like reference numerals designate like parts throughout the figures thereof and in which:

FIG. 3 is a cut-away view of the land cable and the geophone and the interface between the leader cable and the towed land cable.

Figure 1:
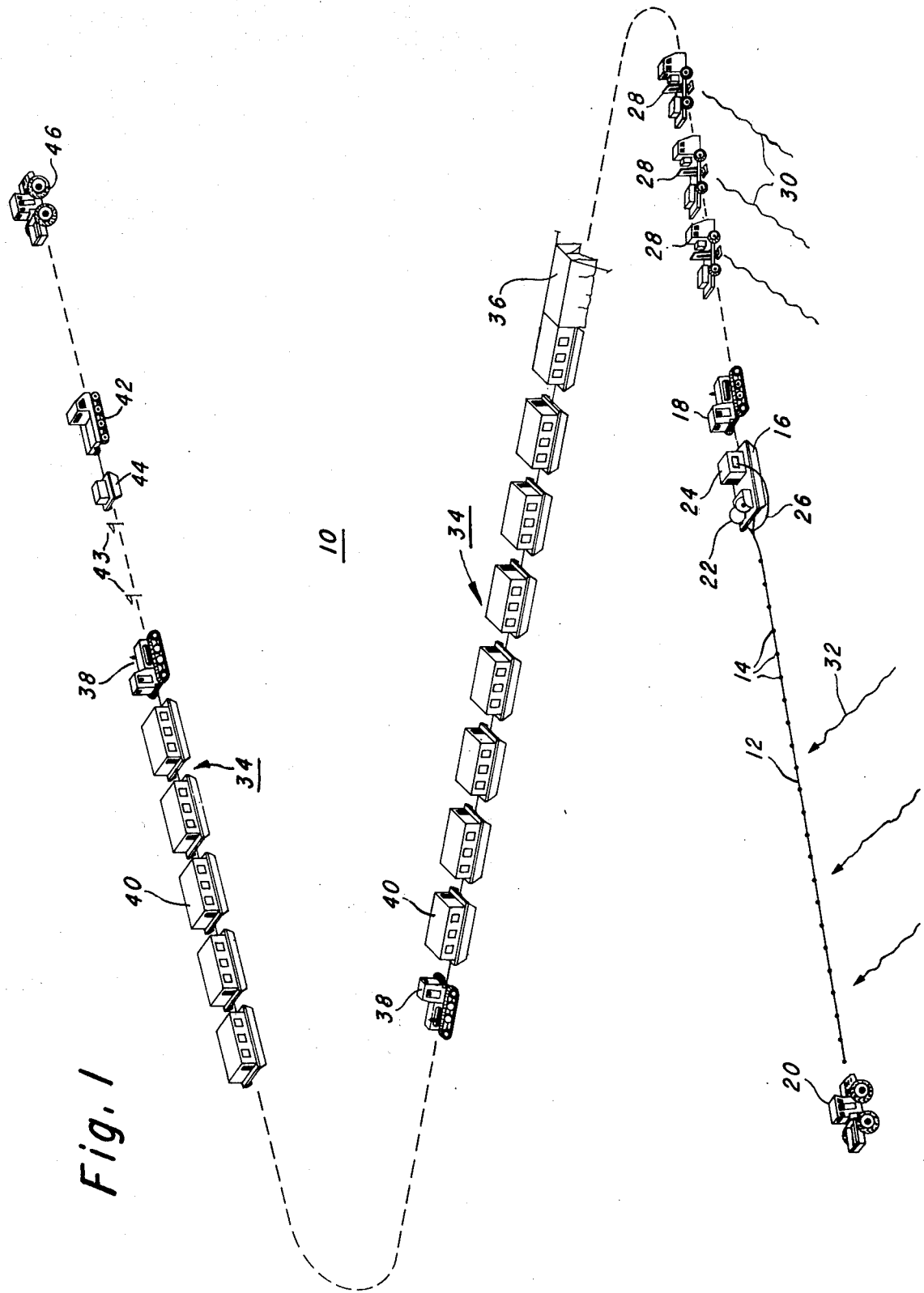
FIG. 1 is an overall view of the towed land cable prospecting operations according to the present invention.

Referring now to FIG. 1 there is illustrated a land cable seismic prospecting operation 10 according to the present invention. This configuration, in a preferred embodiment, may be utilized in arctic operations, such as for example on the North Slope, but it will be recognized that such an operation has equal applicability in primarily flat unobstructed terrain which could also include the desert.

FIG. 1 illustrates the invention which involves, in part, moving a land streamer or cable 12 having sensors 14 which may be geophones (to be described hereinafter) towed by a sled 16 which may be propelled by a caterpillar tractor (cat) 18 or other means of propulsion over a land surface. Land surface would include soil, rock, mud, snow, ice, vegetation and other possible forms of earth covering. Vehicle 20 is used for servicing the streamer and associated geophones as is required. Located on the sled 16 is at least one storage reel which is utilized for storing the land streamer 12 for long distance moves. A digital field system recorder 24 is placed on sled 16 and is electrically interconnected by way of electric cabling 26 to the land cable 12. The digital field system recorder 24 may be of the type manufactured and sold by Texas Instruments Incorporated under the trademark "DFS" III. The recorder 24 may be remote to the survey site and the outputs from sensors 14 may be transmitted to the remote recorder by transmitter means (not shown). This would reduce the quantity of electrical conductors required in the cable. Seismic sources, such as the three buggy vibrator trucks 28 illustrated, generate acoustic disturbances 30 within the earth's surface. The reflections 32 generated by the acoustic disturbances impinging upon various strata in the earth are detected by sensors 14.

Because of the speed advantage afforded by the present invention, it is possible for the camp sites 34 to accompany the prospecting operation 10. Two camp sites are illustrated, one for the land streamer operation and the other for the survey operations. A mechanical shed 36 is associated with the land cable camp site to effect repairs on the land cable, geophones, vehicles and associated equipment. Both camp sites 34 are pulled by cats 38 and include quarters 40 on sleds which house the men working the prospecting operation. A vehicle, for example, the tracked vehicle 42 shown, and the sled 44, perform the necessary survey operations to determine where the vibrator sources 28 and land streamer 12 are to be located. The survey team places associated flags 43 at the correct location for the vibrators and the land streamer. Sled 44 carries the associated equipment for the survey operations while the wheeled buggy 46 performs scouting operations for the survey team.

Figure 2:
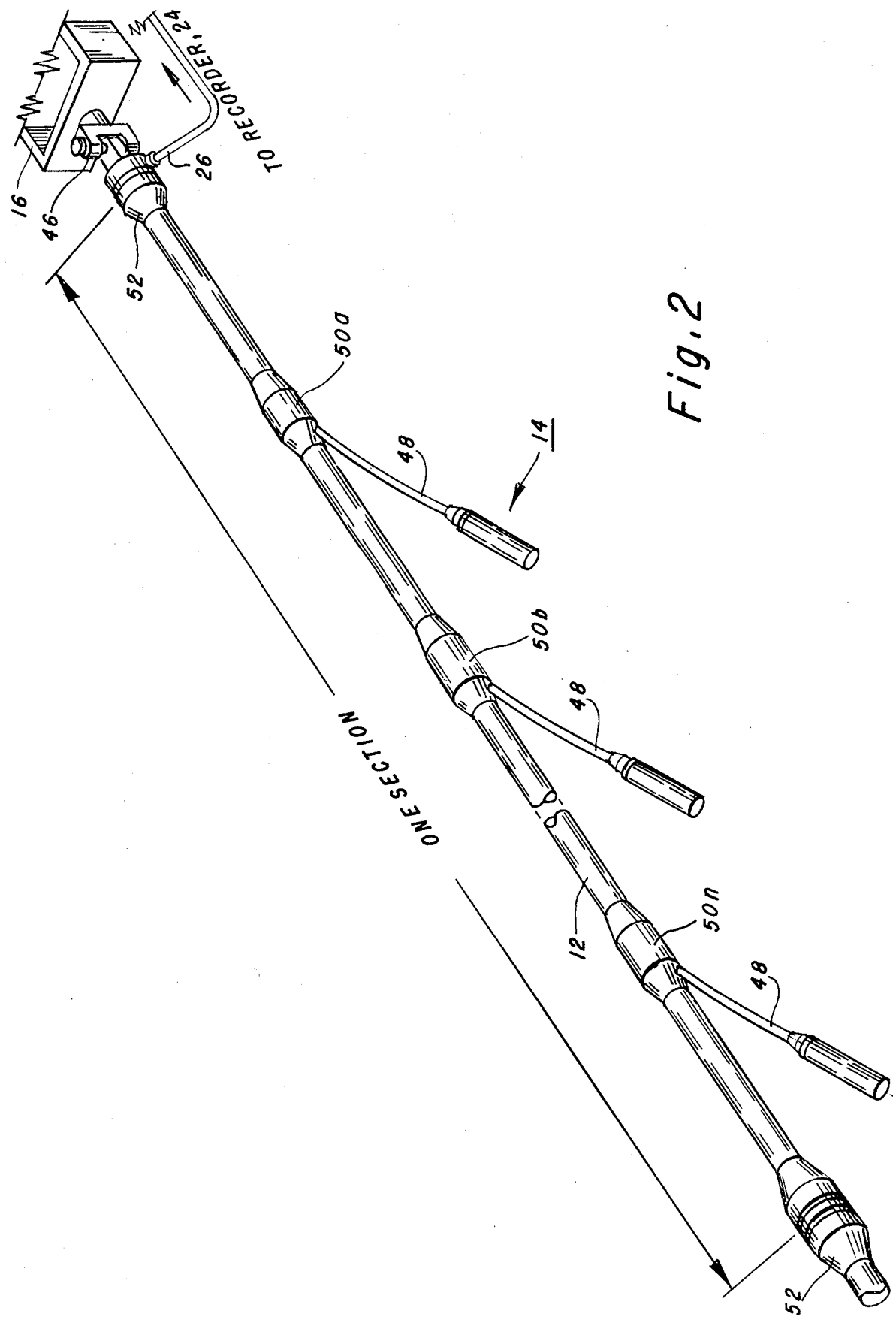
FIG. 2 is a perspective view of a section of the towed land cable illustrated in FIG. 1.

Referring now to FIG. 2, there is illustrated one section of the land cable 12 which is connected to sled 16 by way of pin and yoke coupler 46. A typical land cable may be 1½ miles long and be made up of six sections, each section being typically 1320 feet in length. A typical section might include 48 geophones 14 (only 3 of which have been shown). The geophones 14 are attached to the main cable 12 by way of leader cables 48 which are molded to takeouts 50a to 50n in the main cable. Although the acoustic sensors 14 have been illustrated as connected to the main cable through leader cables 48, it will be recognized that the sensors 14 may be mounted directly on or in the land cable 12. The digital field system recorder 24 (in FIG. 1) may record 24 channels of digital information. In the land cable 12, twelve geophones, for example, are electrically interconnected to produce one channel of recorder information. There would be, accordingly, 24 groups of 12 geophones spaced at group intervals of approximately 330 feet. The spacing between takeouts 50a to 50n may be at non-uniform intervals which allows improved noise cancellation to result. With 24 groups of 12 geophones each, there will be a total of, for example, 288 geophones associated with 6 sections of the land cable 12. Each section of the land cable is connected to the succeeding section by way of connector 52. This connector may be of the type manufactured and sold by Vector Cable Company, Model No. 4210.

FIG. 3 illustrates a cut-away view of the construction of the land cable 12 and the geophone 14 and takeout 50a. Passing through the center of the cable 12 is a stress member 53 which may be a steel wire rope. Molded around the outside of stress member 53 is a plastic rubber coating 54. A plurality of electrical conductors 56 are wrapped around the circumference of coating 54. Coating 54 cushions conductors 56 from the stress member 53. Tape 58 is wrapped around the electrical conductors 56 and holds these conductors in place. This layer of tape may also include an additional layer which is moisture resistant. The cable will be able to operate in a temperature range from −65°F to 175°F and the outer jacket 60 must be abrasion resistant throughout the operating temperature range. The outer jacket 60 of cable 12 may be made of polyurethane.

FIG. 3 further illustrates a cross-section of an acoustic sensor 14 which may be utilized according to the present invention. This acoustic sensor 14 is a cylindrical, velocity sensitive, gimbal mounted geophone which is self-orienting in the horizontal plane. The geophone 14 is separable into two distinct parts, the geophone section 62 and the connector section 64. In the geophone section 62 is located two geophone elements 66 which are mounted in a weighted half-cylinder 68. The weighted half-cylinder rotates in two sets of ballbearings 70 to insure that the geophone elements are vertically aligned with respect to the land surface. The geophone elements 66 are connected electrically and their output eminates from a pair of wires 72 from slip rings 74. This pair of wires are in turn connected to male connector pins 76. The connector section 64 of geophone 14 has included therein a pair of female connector sockets 78 which electrically interconnect with male pins 76. The pair of wires 80 electrically interconnected to sockets 78 carry the output from geophone 14 through leader cable 48 to takeout 50a. To improve the strength of the interconnection between the leader cable 48 and the takeout 50a, the leader cable is successively wound around the circumference of the cable a number of times. The geophone output wires 80 in the leader cables are electrically connected to predetermined conductors in the bundle of electrical conductors 56. The wrapped configuration 82 of the leader cable around the electrical conductors 56 in takeout 50a provides a mechanism whereby the takeout connection exceeds the breaking strength of the leader cable. That is, for example, if the leader cable has a breaking strength of 400 pounds, then the breaking strength of the takeout should exceed 400 pounds in order to insure that if the geophone becomes entangled with some object while the land cable 12 is being towed, the geophone assembly will break along the leader cable length 48 rather than in the takeout 50a; this will allow for easier repairability of the cable. A typical geophone which is similar to the type that might be used is the Model G-11 geophone manufactured and sold by Mark Products, Inc.

Prior to initial operation, the land streamer 12 is unreeled from storage reel 22 on sled 16 (FIG. 1). The geophones are strapped or otherwise coupled (by means not shown) to the main cable when positioned on reel 22. While unrolling the cable these geophones will be unstrapped from the main body of the streamer cable 12. The front end of the cable is then connected to sled 16 by way of the pin and yoke coupler 46 (FIG. 2). After the streamer cable is laid out along its full length it is then towed to the appropriate position designated by the survey vehicle 42 (FIG. 1). Vibrator trucks 28 are also put into their proper position and then generate an acoustic disturbance. Geophones 14, being gimbal mounted, will align the geophone elements 66 in the vertical direction to sense the reflections 32 generated from the earth's strata by acoustic disturbances 30. Furthermore the cylindrical shape insures a good communication between the geophone and the earth as it will roll into any crevice or irregularity in the earth's surface. The output from the respective geophones 14 is coupled by electrical conductors 56 through electrical cabling 26 to the digital field system recorder 24. At the termination of recording of the seismic information, the land cable 12 is towed intact to the next shooting site. In the preferred method, the streamer 12 is towed with the geophones connected thereto. If the geophones are located inside the main cable 12, this would of necessity occur. By towing the cable from one site to the other, substantial advantages are obtained in that the amount of information collected is far greater in a given time period to the extent that it is possible to have a mobile camp to accompany the streamer operations. This will facilitate the capability of the streamer to cover large areas of land. The stress member 53 (FIG. 3) sustains substantially all of the towing force necessary to tow the cable 12. The breaking strength of the stress member 53 should be, for example, in the order of 16,000 pounds minimum but will vary with a number of factors such as the terrain, length of cable, etc. The stress member 53 although illustrated as being inside of the electrical conductor bundle 56 could be placed outside of that bundle.

A plurality of these land cables can be used to obtain different arrays; that is, two-dimensional arrays may be provided using such a plurality. Furthermore, the recording operation may be implemented while the cable is being towed. Furthermore other than seismic wave detection sensors can be utilized, e.g., temperature, moisture, elevation sensors.

The method of this invention allows substantial advantages in that a reduction in the time and manpower required to handle seismic detectors and detector cables is effected because the towed cable does not have to be picked up or handled after it is initially set up.

Although the present invention has been shown and illustrated in terms of a specific method and apparatus, it will be apparent that changes or modifications can be made without departing from the spirit and scope of the invention as defined by the appended claims.

What is claimed is:

1. A seismic land cable system for towing behind a vehicle, said system comprising:
   a. a stress member for withstanding the tension created by the vehicle towing force,
   b. a multiconductor electrical cable positioned about the stress member,
   c. a jacket covering the stress member and multiconductor electrical cable,
   d. a plurality of seismic sensors exterior to said jacket, said sensors including gimbal mounted velocity sensitive geophone elements, and
   e. a corresponding plurality of flexible electrical interconnecting means, each of said plurality of flexible electrical interconnectors having an end mechanically fixed to the jacket and electrically coupled to conductors of the multiconductor electrical cable, and opposite ends mechanically fixed to a sensor and electrically coupled to the geophone element of said sensor.

2. A seismic land cable for towing behind a vehicle, comprising:
   a. stress supporting means for withstanding the tension created by the vehicle towing force;
   b. a multiconductor electrical cable within said cable and concentrically disposed with respect to said stress supporting means, and
   c. a plurality of gimbal mounted velocity sensitive geophones electrically interconnected to said electrical cable by flexible connecting means.

3. A seismic land cable system according to claim 2 wherein said geophones are cylindrical in shape to provide acoustic communication between the land surface and the geophone.

4. A seismic land cable system according to claim 2 wherein said geophones are threadedly attached to said flexible connecting means.

5. A seismic land cable system according to claim 2 wherein said flexible connecting means is a leader cable intermediate said geophone and said land cable.

6. A seismic land cable system according to claim 5 wherein said leader cable is wound a plurality of turns around said electrical cable to provide a strong mechanical connection.

7. In a mechanized land prospecting unit a land cable comprising:
   a. a centrally disposed stress member;
   b. a plurality of electrical conductors disposed about the stress member;
   c. an outer jacket including a plurality of spaced takeouts;
   d. a flexible leader cable for each of said plurality of takeouts having an end portion integral with the takeouts;
   e. a seismic sensor electrically and mechanically connected to the other end of the leader cable; and
   f. coupling means adjacent one end of the cable for coupling the cable to a towing vehicle.

8. A land cable according to claim 7, wherein each of the takeouts are adapted to strengthen the junction of the leader cable and the land cable above the tensile strength of the leader cable.

9. A land cable according to claim 8, wherein the junction of the leader cable and land cable is strengthened in the takeout by winding the leader cable back over a portion of itself forward of the leader cable electrical conductor connection to the land cable electrical conductors.

* * * * *